2,168,987

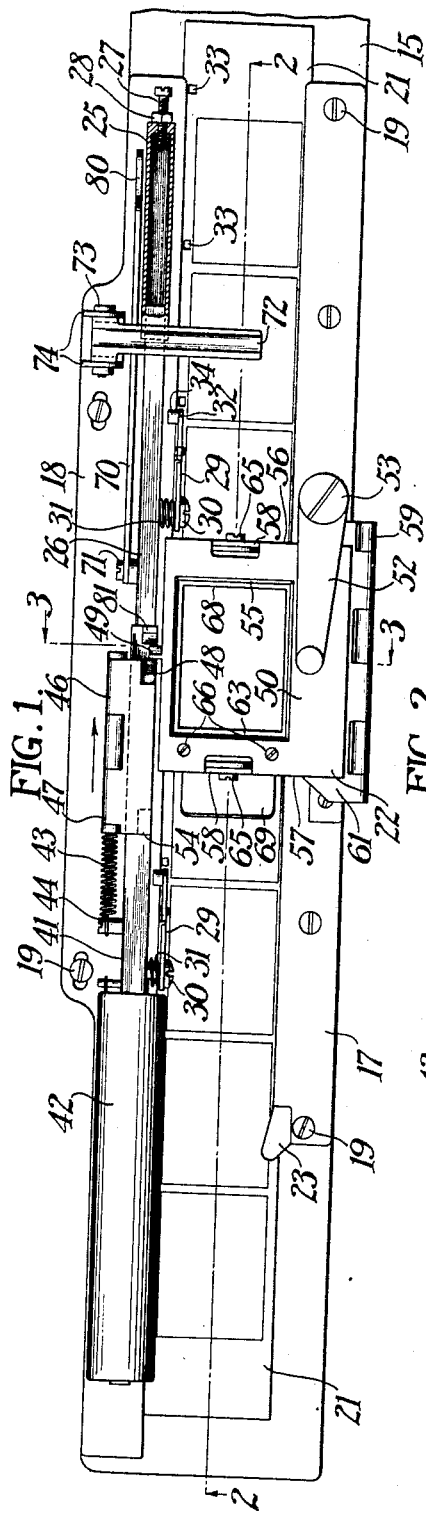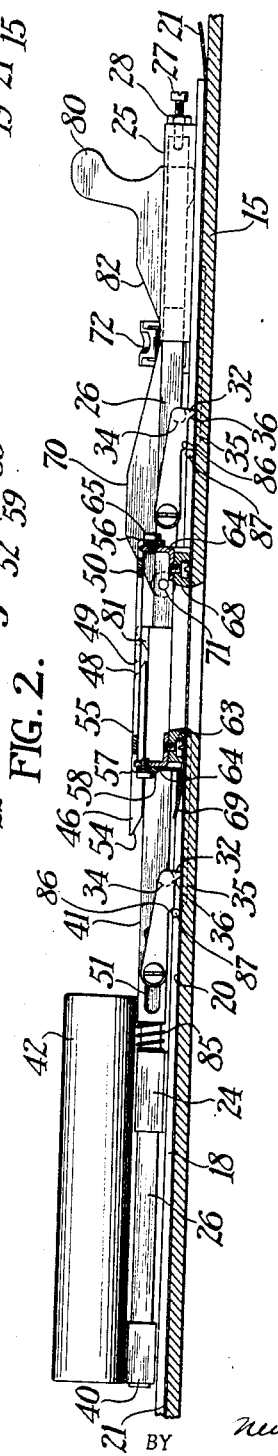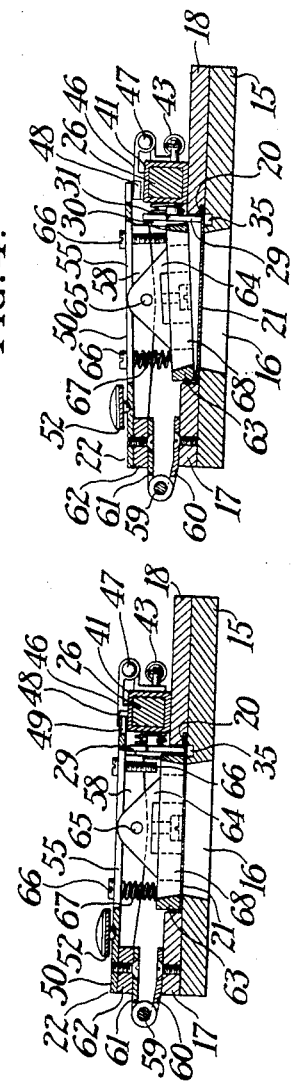

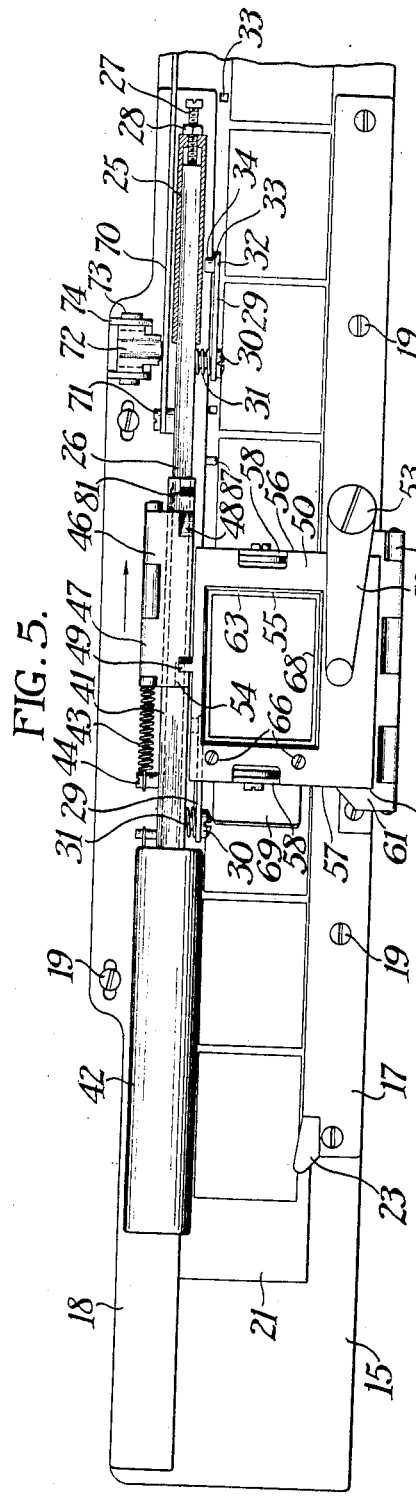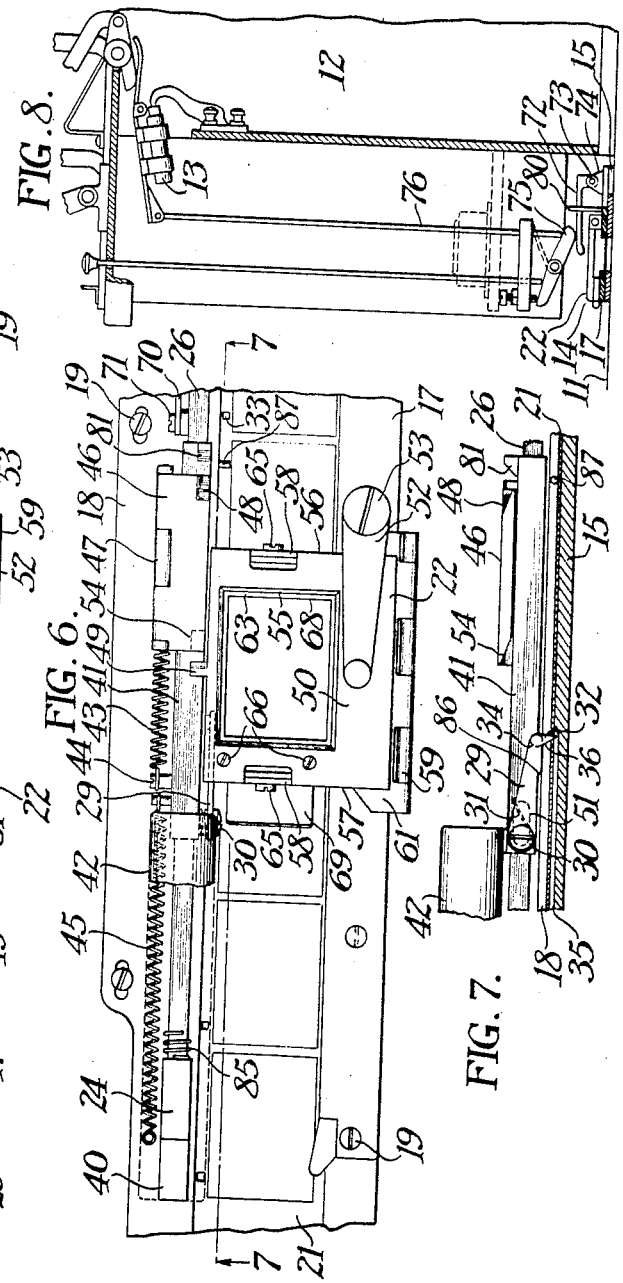
Aug. 8, 1939   R. S. HOPKINS ET AL   2,168,987
FILM FEEDING MECHANISM
Filed June 24, 1937    2 Sheets-Sheet 2
Roy S. Hopkins
Elmer O. Wangerin
INVENTORS
BY
ATTORNEYS Patented Aug. 8, 1939

UNITED STATES PATENT OFFICE 2,168,987

FILM FEEDING MECHANISM

Roy Samuel Hopkins and Elmer O. Wangerin, Rochester, N. Y., assignors to Eastman Kodak Company, Rochester, N. Y., a corporation of New Jersey Application June 24, 1937, Serial No. 150,082

21 Claims. (Cl. 88—18)

This invention relates to photography, and more particularly to a film feeding and positioning mechanism adapted for use with an enlarging printer. This mechanism is arranged to move a strip of miniature marginal perforated negative film past the film gate to bring the successive picture areas into position so that enlarged prints may be made by projection, the various picture areas being held substantially in a plane during the printing operation. The arrangement is particularly designed for use with the enlarging printer shown and described in the patent to R. S. Hopkins, Number 2,033,712, dated March 10, 1936.

An object of the invention is the provision of a film feeding and positioning arrangement adapted for use with miniature negatives in strip form.

Another object of the invention is the provision of a film feeding mechanism which positively moves the perforated film strip and accurately positions the latter in the film gate.

Still another object of the invention is the provision of an arrangement whereby the film gate is automatically opened in timed relation to the feeding of the film strip so that the gate will always be open whenever the stirp is moved, thus preventing scratching or marring of the film strip.

A further object of the invention is the provision of an arrangement whereby a viewing light is automatically turned on whenever the film strip is moved so that the picture area being positioned in the film gate may be viewed prior to the printing operation.

A still further object of the invention is the provision of a miniature film feedng and positioning mechanism which can be readily applied to enlarging printers already on the market.

To these and other ends, the invention resides in certain improvements and combinations of parts all as will be hereinafter more fully described, the novel features being pointed out in the claims at the end of the specifications.

In the drawings:

Fig. 1 is a slightly reduced plan view, with parts in section, of a miniature film feeding and positioning mechanism constructed in accordance with the preferred embodiment of the invention, showing the film gate in closed position and a film feeding device in position to advance the next picture area of the film strip;

Fig. 2 is a slightly reduced vertical sectional view which is taken substantially on the line 2—2 of Fig. 1, showing the arrangement of the various parts of the device;

Fig. 3 is a full size vertical sectional view through the film gate taken substantially on the line 3—3 of Fig. 1, showing the film gate in closed position to clamp the film in a plane for printing by projection;

Fig. 4 is a view similar to Fig. 3, but with the film gate in open position to permit the free movement of the film strip therethrough;

Fig. 5 is a view similar to Fig. 1, showing the film feeding mechanism at the completion of a feeding operation, the film gate being in open position as illustrated in Fig. 4;

Fig. 6 is a view similar to Fig. 5, but with the mechanism in a slightly different position to permit the closing of the film gate, as shown in Fig. 3, to clamp the film for printing;

Fig. 7 is a vertical sectional view of a portion of the device illustrated in Fig. 2, showing the film advancing or pull-down claw; taken substtantially on line 7—7 of Fig. 6; and Fig. 8 is a vertical sectional view through a portion of an enlarging printer of the type illustrated and described in the above-mentioned patent to Hopkins, showing the arrangement for turning on the printing lamp so as to view the picture area being positioned in the gate.

Similar reference numerals throughout the various views indicate the same parts.

In Fig. 8 there is shown a portion of the enlarging printer embodied in the above-mentioned Patent No. 2,033,712, to R. S. Hopkins. This printer comprises, in part, a supporting member or table top 11 on which the film feeding and positioning mechanism of the present invention is arranged. A light directing housing 12 extends upwardly from the table top 11, and has mounted thereon a light control switch 13, and a printing mechanism, not shown, all of which is clearly illustrated and described in the above-referred to patent to Hopkins.

The film feeding mechanism of the present invention is broadly indicated by the numeral 14, and is adapted to move and position a strip of miniature marginal perforated negative film of the "Bantam" type in a film gate which is maintained in alignment with the optical members of the printer so that enlarged prints may be made from the miniature negative film strip. This feeding mechanism comprises, in its broadest aspect, a film feeding claw which may be moved to engage a marginal film perforation to feed the film strip and to position the picture area thereof in a film gate. Prior to the movement of the film strip, the film gate is automatically opened so that the film strip may move freely therethrough. After the picture area of the strip has been properly positioned in the film gate, the latter then automatically closes to securely clamp the picture area to hold it in flat position for printing. During the feeding and positioning of the strip, the light switch is actuated to turn on the printed lamp so that the picture area in the gate may be viewed prior to the printing operation, for reasons well known to those in the art.

The feeding mechanism of the present invention comprises, in the preferred embodiment, a base member 15 formed with a central aperture 16 which maintains in alignment the optical members of the printer in any suitable and well-known manner. Side rails or film guides 17 and 18 are secured along opposite sides of the base 15 by means of screws 19 or other suitable fastening means. These film guides are undercut, as shown at 20 in Figs. 3 and 4, to receive the marginal edges of the film strip 21 to guide the strip along the base 15 and through the film gate, generally indicated by the numeral 22 and hereinafter more fully described.

During the film movement, the base 15 cooperates with the film guides 17 and 18 to guide the film strip through the gate 22 so that the base and the film guides may be broadly considered as film guiding means.

To facilitate the insertion of the strip 21 in the film guides, the guide 17 is preferably terminated short of the guide 18, as illustrated in Figs. 1, 5, and 6. The film strip 21 may be placed in position by moving it laterally relative to the base 15 until a marginal edge of strip is positioned in the recess 20 of the film guide 18. The strip 21 may then be moved longitudinally along the base 15 to feed the other film edge into the recess 20 on guide 17. To insure the feeding of the marginal edge of the film strip 21 under the guide 17, the left end of the latter, as viewed in the drawing, is provided with an upturned portion 23 which engages the forward end of the strip and cams the marginal edge thereof under the guide 17, thus insuring that both edges of the film strip 21 will be positioned in the recesses 20 formed in the opposite film guides 17 and 18 to hold the strip in flat position.

The film guide 18 has mounted thereon spaced tubular members or bearings 24 and 25 in which a rod 26 is reciprocally supported. The bearing 25 is preferably, although not necessarily, of such a length that the end of the rod 26 is never withdrawn therefrom, as shown in Figs. 1 and 5. This rod is adapted to slide back and forth in the members 24 and 25 to advance the film strip 21 in a manner to be presently described. Movement of the rod 26 to the right, as viewed in the drawings, is controlled by an adjustable set screw 27 which is threaded through the end of the member 25 and is locked in adjusted position by a nut 28, as clearly illustrated in Figs. 1 and 5.

The rod 26 carries a pair of film pull-down or advancing claws 29, each of which is pivotally mounted at one end thereof on a screw 30 which extends through the claw and into a threaded opening in the rod 26. A coil spring 31 surrounds the shank of each of the screws 30 and has one end thereof anchored to the rod 26 and the other end secured to the claw 29 so as to force the free end 32 thereof downwardly and into the marginal perforations 33 of the film strip 21. In order to limit the penetration of the end 32 into the perforation 33, the end 32 of each claw 29 is provided with a small lateral projection or knob 34 which is adapted to engage the upper surface of the film guide 18, see Figs. 1 and 2, to arrest the downward movement of the claw 29. The base 15 is preferably undercut as shown at 35, Fig. 7, so that the end of the claw 29 will not engage the base when it projects through the film perforations.

It is apparent from the above description, that when the rod 26 is moved to the right, as viewed in the drawings, by mechanism to be hereinafter described, the free ends 32 of the claws 29 will engage two of the film perforations 33 to feed or advance the film strip along the base 15 and through the gate 22. During this movement of the film strip, the edges thereof are guided by the side rails or film guides 17 and 18. When the film strip has thus been moved to bring the next picture area into position in the gate 22 and into registry with the opening 16 in the base 15, the end of the rod 26 engages the set screw 27 to arrest further movement of the film strip 21 and the rod 26, as clearly shown in Figs. 1 and 5. The set screw 27 may, therefore, be broadly considered as means for positioning the film strip in the gate 22. When, however, the rod 26 is moved in the opposite direction, small cam surfaces 36 on the free ends 32 of the claws 29 engage the trailing edges of the film perforations 33 to cam the claws out of the perforations, the free ends 32 of the claws then ride on the film surface until the rod is returned to its original position, as shown in Figs. 1 and 2.

A pair of tubular members or sleeves 40 and 41 are slidably mounted on the rod 26, and are connected by an operating handle 42 which moves both sleeves as a unit. The sleeve 41 is preferably longer than the sleeve 40 for reasons to be presently described. A coil spring 43 has one end thereof connected to the sleeve 41 and the other end secured to a pin 44 secured to the rod 26 and projecting through a slot, not shown, in the sleeve 41, thus providing a yieldable connection between the rod 26 and the sleeve 41. A second coil spring 45 has one end thereof secured to the sleeve 41 and the other end anchored to the side rail 18, as clearly illustrated in Fig. 6. This spring 45 thus tends to move the sleeve 41, as well as the rod 26, to the left or to an inoperative position as illustrated in Figs. 1 and 2.

The sleeve 41 extends slightly beyond the mid-point of the gate 22, and carries a flat piece 46 hingedly connected at 47 to the sleeve 41, as best shown in Figs. 3 and 4. One end of this piece 46 has the upper edge thereof beveled at 48 to provide a cam surface which is adapted to engage and lift a lug 49 formed integral with an upper or supporting member 50 of the gate 22. When the sleeve 41 is moved to the right, as viewed in the drawing, the cam 48 engages the lug 49 to lift the member 50 to open the gage 22, as shown in Fig. 4. The lug 49 then rides on the top of the member 46 until the rod 26 engages the set screw 27 to limit the movement of the rod 26 and to position the film strip in the gate. The rod 26 is now held against further movement, but the sleeve 41 is still free to slide on the rod 26, and will move relative thereto until the end of the slot 51, formed in the sleeve 41, engages the left screw 30, as clearly shown in Fig. 7, thus limiting further movement of the sleeve 41. However, when the sleeve 41 is thus moved relative to the rod 26, the member 46 is carried to the right and out of engagement with the lug 49, as shown in Fig. 6.

The gate 22 is then snapped into closed position, as shown in Fig. 3, by reason of a leaf spring 52, one end of which engages the upper surface of the support 50, and the other end is secured by a screw 53 to a post, not shown, which extends upwardly from the film guide 17. When, however, the rod 26 and the sleeve 41 are now moved to the left by the spring 45, the lug 49 engages another cam 54 formed on the under left side of the member 46 and lifts the latter, about the hinge 47, so that the lug 49 may slide thereunder to the position shown in Fig. 1. As the rod 26 and sleeves 40 and 41 move in unison, for a period of their movement, they may be broadly considered as a unitary slide which is reciprocally mounted on the film guide 18. Furthermore, because of the slight relative movement of the sleeve 41 and rod 26 these members may also be broadly considered as telescoping members.

The support 50 is formed with a central aperture 55 in alignment with the aperture 16 in the base 15, and is bent along the parallel lines 56 and 57 to provide depending side walls 58, one of which is shown in Figs. 3 and 4. A hinge 59 has one leaf 60 thereof secured to the film guide 17 and the other leaf 61 secured to the support 50 in a manner clearly illustrated in Figs. 3 and 4. A metal filler piece 62 is preferably interposed between the leaf 61 and the support 50 so that the latter may be substantially parallel to the base 15 when the gate is closed, as shown in Fig. 3.

A film engaging platen 63 is adapted to engage the film strip 21 to hold the latter in flat position on the base 15, as shown in Fig. 3. A pair of invetred U-shaped members 64 are secured to opposite ends on the platen 63 and are pivotally mounted on screws 65 which projects through the sides 58 of the support 50 so that the platen 63 may oscillate slightly relative to the support 50. A pair of positioning screws 66 extend through the support 50 and engage the upper surface of the platen 63 to position the latter relative to the support. This adjustment, however, is a factory adjustment and need not be made or changed by the user of the device. The platen 63 is resiliently held in film engaging position by a coil spring 67 which surrounds one of the positioning screws 66. When the gate is in closed position, the central aperture 68 of the platen is in registry with the openings 16 and 55 whereby light rays may pass through the picture area positioned in the gate and may be projected onto a sensitized receiving surface such as shown in the above-mentioned patent to Hopkins.

To insure sufficient film engaging area for the platen 63 adjacent the side rail 17, the latter is notched out at the gate to a depth equal to the recess 20 so that the edge of the platen 63 may project slightly into this notched out portion, as shown in Figs. 3 and 4. When the gate is in open position, as shown in Fig. 4, the lower left corner of the platen 63 forms a substantial continuation of the recess 20 so that the film strip will feed through the gate. To facilitate the feeding of the leading end of the film strip under the platen 63, the latter is provided with a curved plate 69 which engages the leading edge of the film strip and guides the latter between the base 15 and the platen 63, as is apparent from an inspection of the drawings.

When the handle 42 is moved to the right to advance the film strip 21, as above described, an elongated cam 70, pivotally mounted at 71 on the rod 26, engages and lifts a laterally extended arm 72 which is pivoted at 73 to a bracket 74 suitably secured to the side rail 18, as clearly shown in Figs. 1, 2 and 5. When the arm 72 is thus lifted, it engages a pivoted member 75, Fig. 8, which in turn engages and lifts a push rod 76 connected to the light switch 13 whereby the printing lamp, not shown, is turned on so that the picture area positioned in the gate may be viewed in a viewing device such as shown and described in the patent to Hopkins. When, however, the handle 42 is released, the members will be returned to the position shown in Figs. 1 and 2 to move the cam 70 out of engagement with the arm 72 so that the latter may move downwardly and out of engagement with the member 75 to turn off the printing lamp. By means of this arrangement, the feeding or advancing of the film strip is utilized to automatically turn on the printing lamp so that the picture area being positioned in the gate may be viewed prior to the actual printing operation.

In making prints of picture areas in strip form, the various images are successively moved into printing position in the film gate. In some cases, however, it is desirable to make a reprint of one or more of the picture areas previously positioned in the gate. To facilitate the returning of the desired picture area to the gate, the present invention provides a novel arrangement whereby the strip may be slid through the gate in the reverse direction to return the desired picture area into position. It has been found more convenient to slide the film with the left hand rather than with the right hand.

To this end, the cam 70 is extended to provide a hand knob 80 which may be grasped by the right hand. When this knob is moved to the left, it also carries the rod 26 to the left. This backward or retracting movement of the rod 26 brings the left screw 30 into engagement with the end of the slot 51, and thus also carries the sleeve 41 to the left, as shown in Fig. 7. When the sleeve 41 is thus moved, a small cam 81 on the member 46 is brought into contact with the lug 49 on the support 50 to raise the latter to open the gate in the manner above described in connection with the advancing of the film. As the gate is now open, the film strip may be moved in the reverse direction by the left hand to return the desired picture area into printing position in the gate.

When the knob 80 is thus moved, a cam 82, integral with the cam 70 and knob 80, engages and lifts the arm 72 to turn on the printing lamp, in the manner above described, so that the desired image area to be positioned in the gate may be easily and quickly ascertained. By means of this arrangement, the retraction of the rod 26 and the sleeve 41 is utilized to automatically open the gate and to turn on the printing lamp. A coil spring 85 is wrapped around the rod 26 and is positioned intermediate the bearing 24 and sleeve 41 to cushion the retarding movement of the sleeve.

When the sleeve 41 and the rod 26 are retracted, as above described, cam surfaces 86 on the under side of the claws 29 engage pins 87 projecting outwardly from the film guide 18, see Fig. 2. Upon engagement of these cams with the pins 87, the claws 29 are lifted out of engagement with the film strip 21 so that the claws will not engage the perforations 33 when the strip 21 is slid to the left, as above described.

The device operates as follows: The handle 42 is moved to the right thus moving the sleeve 41, and, by reason of the spring 43, also the rod 26. This movement of the rod 26 first brings the film feeding or pull-down claws 29 into engagement with the film perforations 33 to advance or feed the film strip. When the strip has been thus advanced to position the picture area in the gate 22, the end of the rod 26 engages the screw 27 to arrest further movement of the rod 26. This movement of the sleeve 41 brings the member 46 thereon into engagement with the lug 49 on the support 50 of the gate 22 thus opening the latter to permit the film strip to be moved therethrough, the gate opening taking place slightly in advance of the film feeding so as to prevent marring or scratching the film strip. Further movement of the sleeve 41 carries the member 46 out of engagement with the lug 49, see Fig. 6, to permit the gate to close under the action of the leaf spring, 52. When the rod 26 is moved, as above described, the cam 70 engages the arm 72 to lift the latter and the member 75, which, in turn, moves the rod 76 to operate the light switch 13 to turn on the printing lamp. After the film has been thus advanced, the sleeve 41 and rod 26 are returned to their original position under the action of the spring 45.

When reprints are to be made, the knob 80 is pushed to the left, thus moving the rod 26 and sleeve 41 to the left to bring the cam 81 into engagement with the lug 49 to open the gate to permit the film strip to be slid in the reverse direction to return the desired picture area to printing position in the gate. This retracting movement brings the cam 82 into engagement with the arm 72 to operate the printing lamp, so that the image being positioned in the film gate may be viewed prior to the printing operation.

It is thus apparent from the above description that the present invention provides a film feeding and positioning arrangement for use in miniature negative film strip form. It is also apparent that the mechanism positively feeds and accurately positions the film, as well as automatically opening the film gate and turning on the printing lamp.

While one emobdiment of the invention has been disclosed, it is to be understood that the inventive idea may be carried out in a number of ways. This application is, therefore, not to be limited to the precise details described, but is intended to cover all variations and modifications thereof falling within the spirit of the invention or the scope of the appended claims.

We claim:

1. In a device of the character described, the combination of a film guide for a strip of perforated film, a film gate comprising a platen hingedly and oscillatably mounted on said guide and cooperating therewith to maintain said strip in flat position therebetween, a slide reciprocally mounted on and supported by said guide, a spring pressed pull down claw on said slide adapted to engage said perforations upon movement of said slide to move said strip along said guide and to position said strip in said gate, a lug on said gate, and a cam on said slide arranged to engage said lug to open the gate in timed relation to the movement of said slide.

2. In a device of the character described, the combination of a film guide for a strip of perforated film, a film gate comprising a member hingedly mounted on said guide and cooperating therewith to maintain said strip in flat position therebetween, a slide reciprocally mounted on and supported by said guide, a pivoted pull down claw mounted on said slide and adapted to engage said perforations upon movement of said slide to position said strip in said gate when said slide is moved in one direction, means on said claw arranged to engage said guide for limiting the penetration of said claw in said perforations, a cam on said claw for lifting said claw out of said perforations when said slide is moved in the opposite direction, and means on said slide for opening said gate in timed relation to the movement of said slide.

3. In a device of the character described, the combination of a film guide for a strip of perforated film, a film gate comprising a member hingedly and oscillatably mounted on said guide and cooperating therewith to maintain said strip in flat position therebetween, a slide reciprocally mounted on and supported by said guide, film feeding and positioning means comprising a spring actuated claw pivotally mounted on and movable with said slide, a pin on said guide arranged in the path of said claw to engage and lift the latter out of engagement with said strip when said slide is retracted and a cam on said slide adapted to engage said member to open said gate in timed relation to the movement of said film.

4. In a device of the character described, the combination of a film guide for a strip of perforated film, a film gate comprising a member hingedly mounted on said guide and cooperating therewith to maintain said strip in flat position therebetween, a slide reciprocally mounted on said guide, a pull down claw pivotally mounted on said slide, resilient means for moving said claw into said perforations upon operating said slide to move and position said strip in said gate when said slide is moved in one direction, means on said guide for engaging and lifting the claw out of engagement with said strip when said slide is moved in the opposite direction, a pivoted cam on said slide adapted to engage said member to move the latter to open said gate prior to the movement of said strip, and resilient means for closing said gate.

5. In a device of the character described, the combination of a film guide for a strip of perforated film, a film gate comprising a member hingedly mounted on said guide and cooperating therewith to maintain said strip in flat position therebetween, a slide reciprocally mounted on and supported by said guide, a spring pressed pull down claw pivotally mounted on and movable with said slide upon operation of the latter for feeding said strip along said guide, an adjustable stop on said slide and in the path of said slide for limiting the movement of the latter to position said strip in said gate, means for lifting said claw out of engagement with said strip when said slide is retracted and a cam movable with said slide and engaging said member to open said gate prior to the movement of said strip along said guide.

6. In a device of the character described, the combination of a film guide for a strip of perforated film, a film gate comprising a member hingedly mounted on said guide and cooperating therewith to maintain said strip in flat position therebetween, a slide reciprocally mounted on said guide, said slide comprising a pair of telescoping sections movable relative to each other, film feeding and positioning means on one of said sections, and gate opening means on the other of said sections.

7. In a device of the character described, the combination of a film guide for a strip of perforated film, a film gate comprising a member hingedly mounted on said guide and cooperating therewith to maintain said strip in flat position therebetween, a slide reciprocally mounted on said guide, said slide comprising a pair of telescoping sections movable relative to each other, yieldable means connecting said sections, film feeding means on one of said sections for moving said strip along said guide when said slide is moved in one direction, means on said guide for limiting the movement of said one section to position said strip in said gate, and a cam on the other of said sections adapted to engage said member to open said gate.

8. In a device of the character described, the combination of a film guide for a strip of perforated film, a film gate comprising a member hingedly mounted on said guide and cooperating therewith to maintain said strip in flat position therebetween, a slide reciprocally mounted on said guide, means on said slide for feeding said strip to position the latter in said gate, means for moving said slide to bring said feeding means into engagement with said strip, a cam on said slide adapted to engage said member to open said gate when said strip is moved by said feeding means, a second cam on said slide adapted to engage said member to open said gate when said slide is retracted to permit said strip to be moved freely in said gate, and means for retracting said slide.

9. In a device of the character described, the combination of a film guide for a strip of perforated film, a film gate comprising a member hingedly mounted on said guide and cooperating therewith to maintain said strip in flat position therebetween, a slide reciprocally mounted on said guide, means mounted on and movable with said slide for positioning said strip in said gate, a cam hingedly mounted on said slide and adapted to engage said member to open said gate prior to the positioning of said strip therein, said cam movable to an inoperative position to permit said gate to close to clamp the positioned film, means for retracting said slide, and a second cam on said slide adjacent said hinged cam, said second cam being adapted to engage and move said member to open said gate so that said strip may be freely moved therein when said slide is retracted.

10. In a device of the class described, the combination of a stationary film guide for a strip of perforated film, a film gate comprising a member hingedly mounted on said guide and cooperating therewith to maintain said strip in flat position therebetween, film feeding and positioning means including a spring actuated claw reciprocally mounted on said guide and adapted to engage said perforations to move said film along said guide, gate opening means including a cam carried by and operable upon movement of said feeding and positioning means to engage said gate to open the latter, and a pivoted arm mounted on said guide and controlled by the movement of said first-mentioned means for operating a light switch.

11. In a device of the character described, the combination of a stationary film guide for a strip of perforated film, a film gate comprising a member hingedly mounted on said guide and cooperating therewith to maintain said strip in flat position therebetween, a slide reciprocally mounted on said guide, means mounted on and movable with said slide for positioning said film in said gate, means on said slide for engaging said member to open said gate upon movement of said slide, an arm pivotally mounted on said guide and operatively connected to a light switch to control the latter, and control means for said arm mounted on and movable with said slide.

12. In a device of the character described, the combination of a stationary film guide for a strip of perforated film, a film gate comprising a member hingedly mounted on said guide and cooperating therewith to maintain said strip in flat position therebetween, a slide reciprocally mounted on said guide, means mounted on and movable with said slide for positioning said film in said gate, a cam on said slide adapted to engage said member to open said gate upon movement of said slide, a cantilever arm pivotally mounted on said guide and operatively connected to a light switch to control the latter, and a second cam independent of said first cam mounted on and movable with said slide to engage said arm to control said switch in timed relation to the movement of said slide.

13. In a device of the character described, the combination of a film guide for a strip of perforated film, a film gate comprising a spring pressed member hingedly mounted on said guide and cooperating therewith to maintain said strip in flat position therebetween, a rod slidably mounted on said guide, a film feeding claw on said guide adapted to engage the perforations in said strip to feed the latter through said gate, means engaging said rod for limiting the travel thereof to position said strip in said gate, a tubular member slidable on said rod, means for moving said tubular member to feed said film, a yieldable member operatively connecting said rod to said tubular member, and a cam hingedly secured to said tubular member and adapted to engage and lift said spring pressed member to open said gate, said cam being movable after said strip is positioned in said gate to permit the latter to close to clamp said strip.

14. In a device of the character described, the combination of a film guide for a strip of perforated film, a film gate comprising a spring pressed member hingedly mounted on said guide and cooperating therewith to maintain said strip in flat position therebetween, a rod slidably mounted on said guide, a film feeding claw on said guide adapted to engage the perforations in said strip to feed the latter through said gate, means for limiting the travel of said rod to position said strip in said gate, a tubular member slidable on said rod, means for moving said tubular member to feed said film, a yieldable member operatively connecting said rod to said tubular member, resilient means for returning said rod and tubular member to an inoperative position, a cam hingedly secured to said tubular member and adapted to engage and lift said spring pressed member to open said gate to permit said film strip to be fed therethrough, said cam being movable out of engagement with said spring pressed member after said strip has been positioned whereby said gate may close to clamp said strip in a flat position, means for retracting said slide, means on said guide for lifting said claw out of engagement with said strip when said slide is retracted, a stationary cam on said tubular member adjacent said hinged cam, said stationary cam engaging said spring pressed member to lift the latter when said slide is retracted to permit said strip to be moved freely through said gate, an arm pivoted at one end to said guide and operatively connected to a light switch to control the latter, and cam means hingedly secured to said rod and engaging said arm to move the latter when said slide is moved to feed the film or when the slide is retracted.

15. In a device of the character described, the combination of a film guide for a strip of perforated film, means for feeding said strip along said guide, a film gate comprising an apertured member hingedly secured to said guide, means engaging said feeding means for positioning said strip in said gate, an apertured film engaging platen pivotally mounted on said member, and means controlled by said feeding means for engaging said hinged member to lift the latter to move said platen out of engagement with said strip to permit said strip to be fed through said gate.

16. In a device of the character described, the combination of a film guide for a strip of perforated film, a film gate in which said strip is positioned, film feeding and positioning means mounted on said guide, said gate comprising an apertured support hingedly secured to said guide, a pair of inverted U-shaped members pivotally mounted on opposite sides of said support, an aperture film engaging platen secured to said U-shaped members and movable relative to said support so as to maintain said strip in flat position, means on said support for positioning said platen thereon, and means for lifting said support prior to the movement of said strip to move said platen out of contact wtih said strip to permit the free passage thereof through said gate.

17. In a device of the character described, the combination of a film guide for a strip of perforated film, a film gate in which said strip is positioned, film feeding and positioning means mounted on said guide, said gate comprising an apertured support hingedly secured to said guide, a pair of inverted U-shaped members pivotally mounted on opposite sides of said support, an apertured film engaging platen secured to said U-shaped members and movable relative to said support so as to maintain said strip in flat position, means on said support for positioning said platen thereon, a leaf spring mounted on said guide and engaging said support to hold said platen in engagement with said strip, and means controlled by said film feeding means and adapted to engage and lift said support to move said platen out of engagement with said film strip prior to the movement thereof by said feeding means.

18. In a device of the character described, the combination of a film guide for a strip of perforated film, a film gate comprising a member hingedly secured to said guide, film-feeding means reciprocally mounted on said guide and arranged to engage the perforations in said film to feed the latter through said gate, means on said guide cooperating with said feeding means for positioning said strip in said gate, a light switch, control means for said light switch, means controlled by said feeding means for operating said control means, and means movable with said feeding means for engaging said member to open said gate prior to the movement of the film strip therethrough.

19. In a device of the character described, the combination of a film guide for a strip of marginal perforated negative film, a film gate comprising a member hingedly mounted on said guide and cooperating therewith to maintain said strip in flat position therebetween, film feeding means reciprocally mounted on said guide and arranged to engage the perforations in said film to feed the latter through said gate, a set screw mounted on said guide and engaging said feeding means to limit the movement thereof to position a picture area of said strip in said gate, a light switch, control means for said light switch, means controlled by said feeding means for operating said control means, cam means movable with said feeding means for engaging said member to open said gate prior to the movement of the film strip therethrough, means for retracting said feeding means, cam means independent of said first-mentioned cam means for opening said gate when said feeding means is retracted, and means adjacent said retracting means and movable therewith for operating said light control means when said feeding means is retracted.

20. In a device of the character described, the combination of a film guide for a strip of perforated film, a film gate comprising a movable member hingedly mounted on said guide, a platen oscillatably mounted on said member and co-operating with said guide to hold said strip in flat position in said gate, a slide reciprocally mounted on said guide, a pull down claw movably secured to said slide and adapted to engage said perforations to move said strip along said guide and through said gate, and a member on said slide adapted to engage said gate member to move the latter and said platen to open said gate prior to the engagement of said claw with said film.

21. In a device of the character described, the combination of a film guide for a strip of perforated film, a film gate comprising a movable member hingedly mounted on said guide, a platen oscillatably mounted on said member and cooperating with said guide to hold said strip in flat position in said gate, a slide reciprocally mounted on said guide, a member at said slide adapted to engage said movable gate member to open the gate upon movement of said slide, a pull down claw arranged to engage said perforations upon movement of said slide to move said strip through said gate, and means for movably securing said claw on said slide.

ROY SAMUEL HOPKINS.
ELMER O. WANGERIN.